Oct. 17, 1972   J. T. SHIELDS   3,698,990
TEAR-OFF BLADE ARRANGEMENT FOR LAMINATING MACHINE
Filed March 12, 1971

INVENTOR.
JOHN T. SHIELDS
BY Hofgren, Wegner, Allen,
Stellman & McCord.
ATTORNEYS.

United States Patent Office 3,698,990
Patented Oct. 17, 1972

3,698,990
TEAR-OFF BLADE ARRANGEMENT FOR LAMINATING MACHINE
John T. Shields, Terre Haute, Ind., assignor to Marlan Company
Filed Mar. 12, 1971, Ser. No. 123,678
Int. Cl. B26f *3/02;* B32b *31/18*
U.S. Cl. 156—522                         5 Claims

ABSTRACT OF THE DISCLOSURE

A tear-off blade arrangement for a plastic laminating machine having a cutting edge spaced from the outfeed slot of the laminator and oriented at an angle relative to the path of travel of the laminated product.

BACKGROUND OF THE INVENTION

Field of the invention

This invention relates to plastic laminating machines and more particularly to an improvement in a tear-off blade for the laminated product.

Brief description of the prior art

Generally speaking, the tear-off blade arrangement of this invention is intended for use in a machine of the type shown in Hill Pat. 3,205,995, Dunn design Pat. D-205,468, and having the pressure roller arrangement as shown in Isbey Pat. No. 3,132,581. Generally speaking, such devices are utilized for laminating card-like articles between adhesive backed clear tape which is fed from a supply roll to two pressure rollers. A card-like article is fed between the pressure rollers which, in turn, are driven to laminate the card on both sides with clear plastic tape. The laminated card then is fed out an outfeed slot at the rear of the laminator. The strip may be severed by tearing along a cut-off blade which is located at the outfeed slot.

There is in the art, patents showing cut-off blades for tape dispensing type machines as represented by the Coldiron Pat. 2,572,245 and the Krueger Pat. 2,777,594. Each cutting blade has a toothed edge which is beveled at a generally 45° angle on one face thereof. However, the angular orientation of the cutting blade is not related to an outfeed slot of the mechanism such as a plastic laminating machine as described.

Heretofore, in coin-operated laminators, such as illustrated in the aforementioned Hill and Dunn design patents, problems have arisen with respect to the tear-off blade arrangement. More specifically, a gummy residue accumulates on the blade after a short period of time, rendering the tear-off function more difficult. Also, the remaining portion of the strip tends to return inwardly of the housing and create a jam-up between the pressure rollers. Thus, it is the object of this invention to provide an improved cutting blade arrangement for a coin-operated laminating machine to obviate the problems heretofore known in the art.

SUMMARY OF THE INVENTION

This invention is directed, in brief, to the provision of an improved tear-off blade arrangement for a plastic laminating machine.

The best mode currently contemplated for carrying out the invention includes the provision of a laminating machine having a housing and framing inside the housing which supports tape rollers and pressure rollers between which the tape is fed. The housing includes an outfeed slot closely adjacent the pressure rollers. A tear-off blade is mounted on the housing adjacent to the outfeed slot, but the tear-off blade has a beveled, serrated edge and the blade itself is oriented at an angular disposition with respect to the housing and the path of travel of the laminated product so that the serrated edge is spaced away from the outfeed slot and the beveled edge itself is generally parallel to the path of travel of the laminated product.

Figure 1:
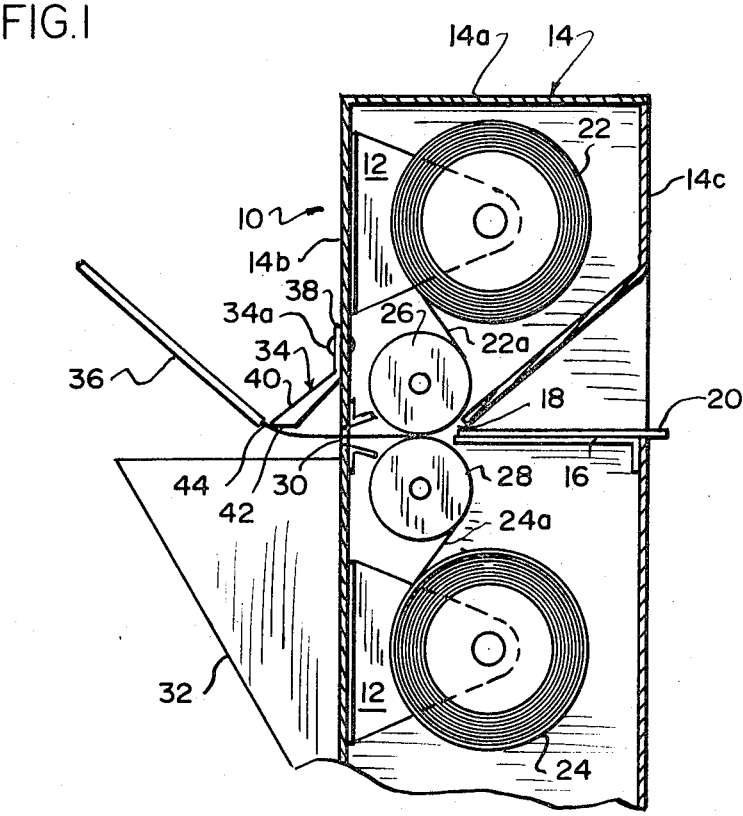
FIG. 1 is a fragmentary section view through a portion of the laminating machine utilizing the tear-off blade arrangement of this invention.
Figure 2:
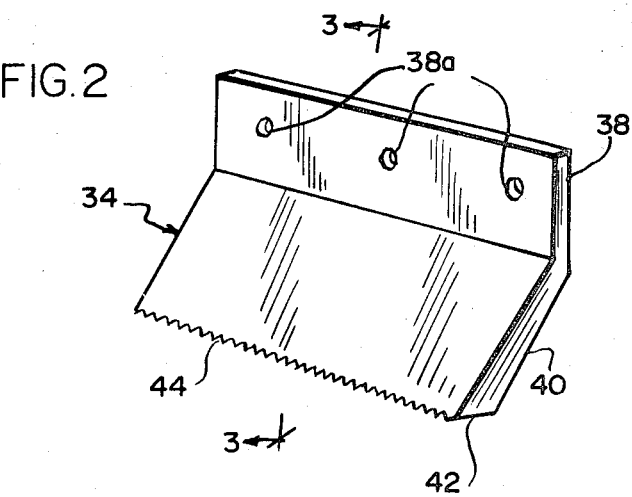
FIG. 2 is a perspective view of the blade shown mounted on the laminating machine in FIG. 1
Figure 3:
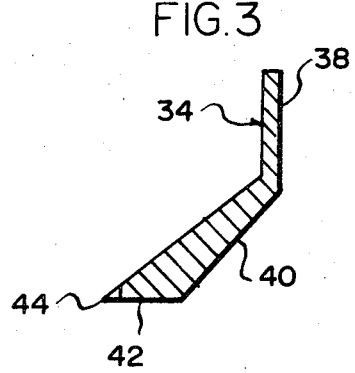
FIG. 3 is a section view taken generally along the line 3—3 of FIG. 2.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

BRIEF DESCRIPTION OF THE PREFERRED EMBODIMENT

Referring to the drawings, there is partially shown in FIG. 1, a coin-operated laminating machine 10 having interior supporting frame structure 12 and an exterior housing 14 including a top 14a, rear wall 14b and front wall 14c.

The front of the housing includes a generally horizontally oriented infeed shelf 16 which terminates adjacent infeed slot 18 formed in the front of the housing for feeding a card-like article 20 into the interior of the housing to be laminated. A pair of upper and lower tape rolls 22 and 24, respectively, are mounted in the frame supports 12. In operation, a web of adhesively backed clear plastic tape 22a and 24a extends from each roll 22 and 24, respectively, and is fed between upper and lower tangentially adjacent pressure rollers 26 and 28.

The rear wall 14b of the housing 14 has an outfeed slot 30 closely adjacent to the pressure rollers 26 and 28 for feeding the laminated product outwardly of the housing. A waste receptacle bin 32 is connected to the rear wall 14b below the outfeed slot 30. The shelf 16, infeed slot 18, pressure rollers 26 and 28, and outfeed slot 30 define a laminating path of travel through the machine. The cutting blade 34 of this invention is affixed to the rear wall 14b above the outfeed slot 30 by suitable fasteners 34a. The function of the cutting blade is to sever a laminated product 36 from the remainder of the strip of tape 22a, 24a, after the card-like article 20 has been fed into the machine and laminated between the pressure rollers 26 and 28 and advanced outwardly of the outfeed slot 30.

The cutting blade 34 includes an attaching portion 38 for connection to the rear wall 14b to receive fastener 34a, attaching portion 38 is provided with openings 38a. Blade 34 further includes a planar body 40 which extends at an acute angle with respect to the path of travel of the laminated web. Body 40 terminates in a beveled end 42 which is generally parallel to the laminating path of travel. The rearward or outside edge 44 of the beveled end is serrated and provided with a plurality of cutting teeth which lie in the plane of the body and therefore are inclined or at an acute angle relative to the laminating path of travel.

In those instances where the tear-off blades were mounted immediately adjacent the outfeed slot and wherein the cutting edge was perpendicular to the laminating path of travel, two difficulties arose from time to time. The cutting end tended to accumulate gummy residue of the adhesive coated tape which interfered with severance of the laminated product from the strip. In addition, the tape would tend to curl back into the machine through the outfeed slot and jam the pressure rollers. It has been found that the tear-off blade arrangement of this invention overcomes these former problems. It is believed that any accumulation of tape residue occurred on the beveled end, not on the serrated edge. The remote proximity of the cutting edge relative to the outfeed slot produces an elongated "leader" strip of laminated tape which does not curl back through the outfeed slot and which may adhere to the gum residue on the beveled end.

The foregoing detailed description has been given for clearness of understanding only, and no unnecessary limitations should be understood therefrom, as some modifications may be obvious to those skilled in the art.

I claim:

1. A tear-off blade arrangement for use in a plastic laminating machine having a housing including front and rear walls and means therethrough defining a laminating path of travel, with frame means in the housing, a tape roll supported in the frame, laminating rolls in the housing adjacent the laminating path of travel for laminating tape to a card-like article fed through the laminating path of travel, and an outfeed slot in the rear wall of the housing in alignment with the laminating path of travel and adjacent the laminating rollers, the blade arrangement comprising a strip severance means connected to the rear wall of the housing outside of the outfeed slot, said strip severance means including a cutting edge spaced rearwardly of the outfeed slot and lying in a plane disposed at an acute angle relative to the laminating path of travel.

2. The tear-off blade arrangement of claim 1 wherein the cutting edge is part of a blade having a mounting portion for affixation to the laminator housing and a cutting portion including a body terminating in a beveled end.

3. The tear-off blade arrrangement of claim 2 wherein the beveled end is generally parallel to the path of travel of the laminated product.

4. The tear-off blade arrangement of claim 2 wherein the cutting edge is a serrated edge of the beveled end.

5. The tear-off blade arrangement of claim 3 wherein the blade has a forward face adjacent to the outfeed slot and a rear face remote from the outfeed slot, and wherein the beveled end of the blade extends from the forward face upwardly and rearwardly to the rearward face, defining the cutting edge thereat.

References Cited

UNITED STATES PATENTS

| | | | |
|---|---|---|---|
| 3,658,628 | 4/1972 | Zenter | 156—527 |
| 2,839,139 | 6/1958 | Vogt | 225—91 X |
| 3,351,511 | 11/1967 | Petterson | 156—527 |
| 3,542,628 | 11/1970 | Fink | 156—527 |
| 3,567,087 | 3/1971 | Schramm | 225—91 X |
| 3,586,587 | 6/1971 | Boyce | 156—527 |

HAROLD ANSHER, Primary Examiner

U.S. Cl. X.R.

156—269, 381, 527; 225—91